(12) United States Patent
Conner

(10) Patent No.: US 10,572,542 B1
(45) Date of Patent: Feb. 25, 2020

(54) IDENTIFYING A VEHICLE BASED ON SIGNALS AVAILABLE ON A BUS

(71) Applicant: Lytx, Inc., San Diego, CA (US)

(72) Inventor: Steve Charles Conner, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 5 days.

(21) Appl. No.: 15/634,413

(22) Filed: Jun. 27, 2017

(51) Int. Cl.
*G05D 99/00* (2006.01)
*G06F 16/903* (2019.01)
*G06F 13/40* (2006.01)

(52) U.S. Cl.
CPC .... *G06F 16/90335* (2019.01); *G06F 13/4063* (2013.01)

(58) Field of Classification Search
None
See application file for complete search history.

(56) References Cited

U.S. PATENT DOCUMENTS

| | | | | |
|---|---|---|---|---|
| 5,325,711 A | * | 7/1994 | Hamburg | F02D 41/1495 123/688 |
| 2002/0027499 A1 | * | 3/2002 | Chainer | G07C 5/008 340/426.24 |
| 2006/0045107 A1 | * | 3/2006 | Kucenas | H04L 12/2803 370/401 |
| 2007/0216573 A1 | * | 9/2007 | Handermann | G01S 5/0027 342/357.22 |
| 2008/0175438 A1 | * | 7/2008 | Alves | G08G 1/0175 382/105 |
| 2013/0217409 A1 | * | 8/2013 | Bridges | B60L 53/305 455/456.1 |
| 2013/0344856 A1 | * | 12/2013 | Silver | H04M 1/72577 455/418 |
| 2015/0106010 A1 | * | 4/2015 | Martin | G01C 21/34 701/410 |

* cited by examiner

*Primary Examiner* — Hyun Nam
(74) *Attorney, Agent, or Firm* — Van Pelt, Yi & James LLP

(57) ABSTRACT

A system for identifying a vehicle includes an input interface and a processor. The input interface is configured to receive traffic from a vehicle bus. The processor is configured to determine a data fingerprint from the traffic; and determine an identifier for the vehicle from the fingerprint.

17 Claims, 13 Drawing Sheets

Odometer: 197,456 miles

Engine Total Running Time: 7,811 hours

Engine Total Idle Time: 592 hours

Fig. 6

| Vehicle | Vehicle Make/Model | Number of Unique Packets |
|---|---|---|
| Aura532 | 2009 Saturn Aura | 47 |
| Impala440 | 2017 Chevrolet Impala | 96 |
| Malibu508 | 2012 Chevrolet Malibu | 31 |
| Malibu590 | 2009 Chevrolet Malibu | 47 |
| Silverado003 | 2007 Chevrolet Silverado | 55 |
| Silverado607 | 2013 Chevrolet Silverado | 63 |
| Silverado994 | 2010 Chevrolet Silverado | 57 |
| Volt676 | 2016 Chevrolet Volt | 114 |
| XTS389 | 2017 Cadillac XTS | 110 |

IDENTIFYING A VEHICLE BASED ON SIGNALS AVAILABLE ON A BUS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. However, analysis of sensor data and reporting and storing of data rely on the ability to know about the vehicle associated with the vehicle event recorder. For example, thresholds for sensor data depend on vehicle characteristics and, in some cases, vehicle driver characteristics. Also, storage of event data, performance data, or other use data should be in association with the specific vehicle that the vehicle event recorder is attached to. However, sometimes the vehicle information is not entered into the vehicle event recorder or is entered incorrectly. This leads to incorrect event identification as well as associating stored data with the wrong vehicle.

BRIEF DESCRIPTION OF THE DRAWINGS

Various embodiments of the invention are disclosed in the following detailed description and the accompanying drawings.

FIG. 6 is a diagram illustrating an embodiment of packet counter data.

FIG. 7A is a table illustrating an embodiment of a number of unique frames.

FIGS. 7B and 7C are tables illustrating an embodiment of a frame range map.

DETAILED DESCRIPTION

Figure 1:
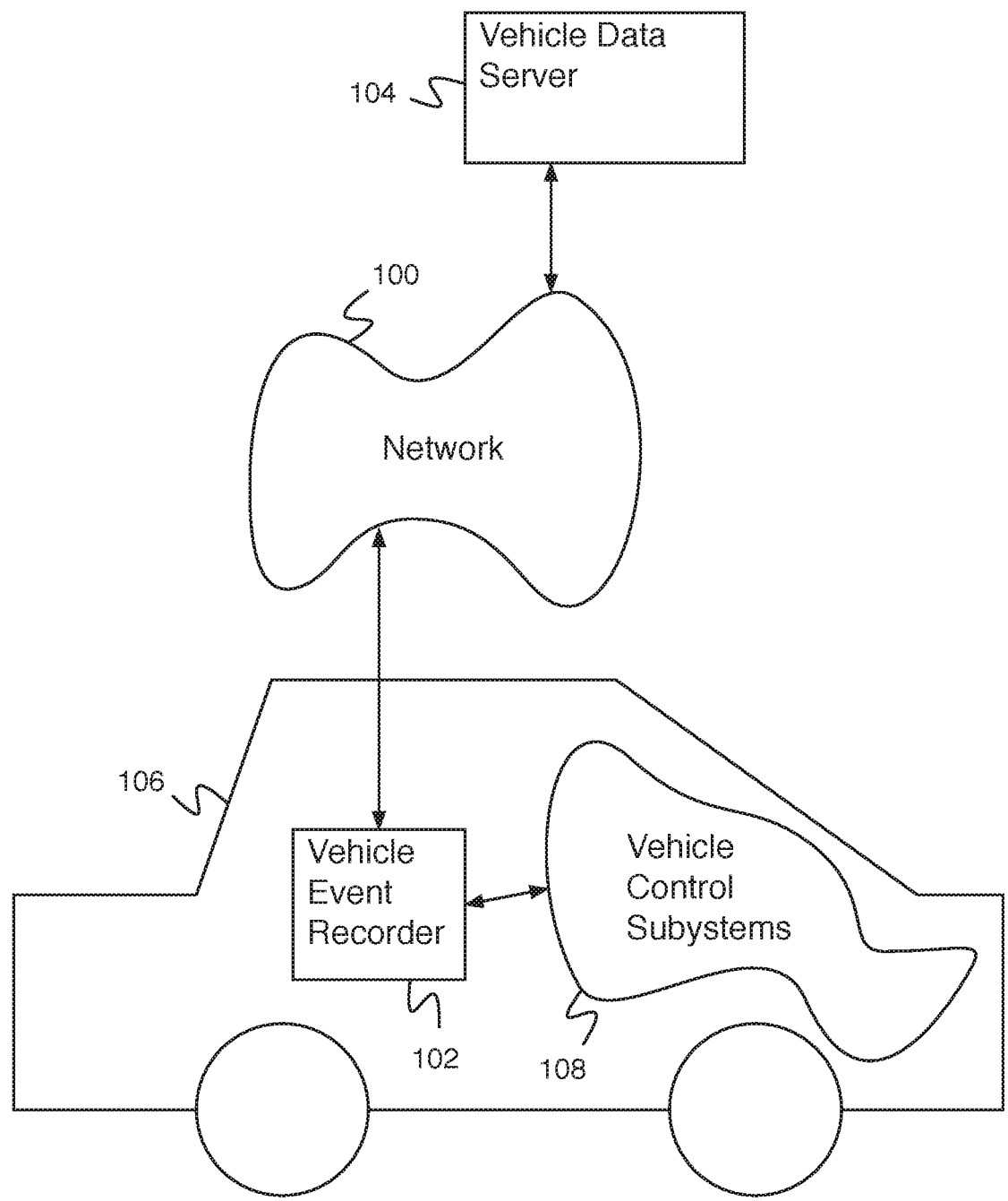
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identifying a vehicle comprises an input interface configured to receive traffic from a vehicle bus, and a processor configured to determine a unique data fingerprint from the traffic and determine an identifier for the vehicle from the fingerprint. In some embodiments, the system additionally comprises a memory coupled to the processor and configured to provide the processor with instructions.

In some embodiments, a system for identifying a vehicle comprises a system for identifying a vehicle automatically based on traffic on a vehicle bus. A vehicle bus comprises a communications bus for connecting a set of vehicle subsystems (e.g., an engine control subsystem, a battery management subsystem, a door control subsystem, a brake control subsystem, a human interface subsystem, etc.). The system for identifying a vehicle receives a set of traffic from the vehicle bus and determines a data fingerprint from the traffic. Determining a data fingerprint from the traffic comprises determining a uniquely identifying set of information from the traffic. In some embodiments, traffic on a vehicle bus comprises a set of packets, each packet includes one or more of the following data: a source data (e.g., a source subsystem), a destination data (e.g., a destination subsystem), and a set of payload data. In some embodiments, a data fingerprint comprises packet source information (e.g., a packet source address, etc.) or packet destination information (e.g., a destination address, etc.). In some embodiments, a data fingerprint comprises packet data (e.g., odometer data, total engine running time data, total engine idle time data, byte ranges, etc.). A data fingerprint is built (e.g., a hash of data derived from packets), and compared with data in a fingerprint database (e.g., a local fingerprint database, a fingerprint database on a remote server, etc.) to determine vehicle identifying information. In some embodiments, a specific vehicle is identified (e.g., by its vehicle identification number). In some embodiments, a vehicle type is identified (e.g., by make, model, year, configuration, etc.).

In some embodiments, a system for identifying a vehicle comprises a system for identifying a vehicle automatically based on a vehicle network that is packet switched. For example, vehicle protocol J1939 or a vehicle manufacturer specific protocol. A vehicle generates a finite set of frame identifiers for its packets during normal operations. A map of this finite set of frame identifiers is known as a frame identifier map. In some embodiments, the frame identifier map includes a capability of the vehicle. A map of the data ranges for each byte in the frame is known as a frame data range map. In some embodiments, the frame data range map is associated with the operating characteristics of the vehicle.

FIG. 1 is a block diagram illustrating an embodiment of a system including a vehicle event recorder. In the example shown, vehicle event recorder 102 receives data about vehicle control subsystems 108 by examining data packet information transmitted on one or more communication busses. Data packet information is extracted based on relevance (e.g., counter data, core or stable data (as opposed to transient data), etc.) and is used to construct one or more fingerprints (e.g., concatenated and hashed). For example, data packets are monitored for and stored to determine byte ranges within the byte values for a time period. If the byte ranges are stable the byte ranges are concatenated into a string and hashed to determine a fingerprint. Or for example, specific counters (e.g., engine life, odometer, etc.) are identified in data packets and used for a fingerprint. The fingerprint(s) is/are then compared to a database of stored fingerprint(s) to identify (e.g., determine a most likely or a likely) associated vehicle identifier (e.g., a fleet identifier, a vehicle identification number (VIN), etc.). For example, the hashed fingerprints match database stored fingerprints associated with a vehicle and counter values are within nearby value ranges that have incremented since a last determination (e.g., counter x is within threshold range y from last stored value y' and x is greater than y'). The vehicle identifier is then stored associated with the vehicle trip stored data (e.g., on vehicle event recorder 102 and/or on vehicle data server 104).

In the example shown, vehicle event recorder 102 comprises an event recorder mounted in a vehicle (e.g., a car or truck). Vehicle event recorder 102 includes or is in communication with a set of sensors—for example, video recorders, audio recorders, accelerometers, gyroscopes, vehicle state sensors, proximity sensors, a global positioning system (GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, or any other appropriate vehicle state sensors. Vehicle event recorder 102 comprises a system for receiving and processing sensor data. Vehicle event recorder 102 comprises a system for detecting events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. Network 100 comprises a network for communications. In various embodiments, network 100 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost, etc.). In some embodiments, network 100 has a different cost at different times (e.g., a higher cost during the day and a lower cost at night). Vehicle event recorder 102 communicates with vehicle data server 104 via network 100.

Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a center where equipment, space, and bandwidth are available for rental), at a cloud service provider, or any at other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. Vehicle 106 additionally comprises vehicle control subsystems 108. Vehicle control subsystems 108 comprises one or more control systems for controlling elements of vehicle 106 (e.g., an engine control subsystem, a battery management subsystem, a door control subsystem, a brake control subsystem, a human interface subsystem, etc.). Vehicle control subsystems 108 additionally comprises a communications bus for communications between the control systems. Vehicle event recorder 102 comprises a system for identifying a vehicle (e.g., vehicle 106) based on signals available on the bus of vehicle control subsystems 108 (e.g., communications between the control systems of vehicle control subsystems 108).

Figure 2:
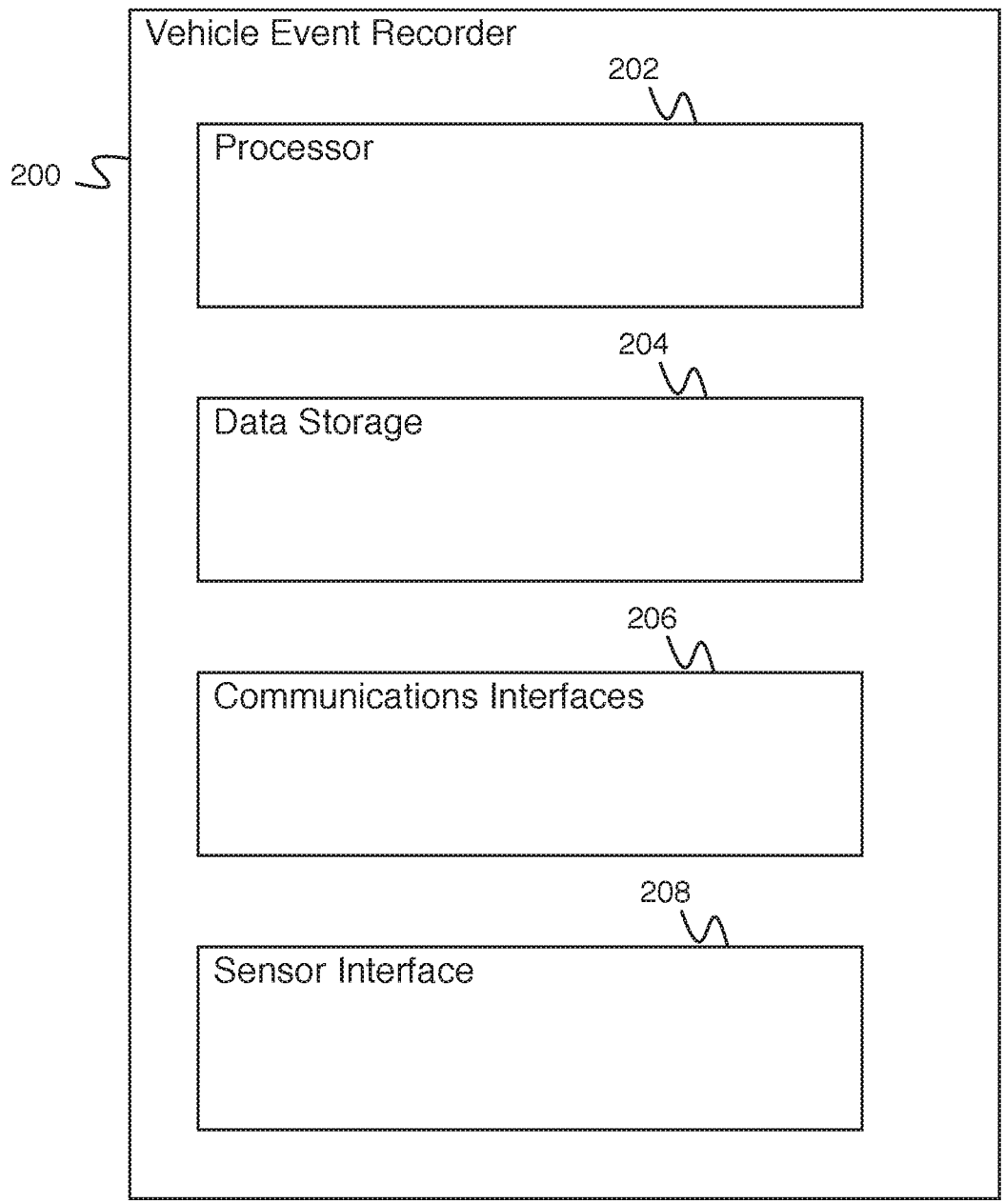
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 receives data about vehicle subsystems by examining data packet information transmitted on one or more communication busses—for example, using communications interfaces 206 and sensor interface 208. Data packet information is extracted based on relevance (e.g., counter data, core or stable data (as opposed to transient data), etc.) and is used to construct one or more fingerprints (e.g., concatenated and hashed). For example, data packets (e.g., all packets, groups of types of packets—for example, all packets of a first type of bus, all packets related to a subsystem, etc.) are monitored for and stored (e.g., using data storage 204) to determine, using processor 202, byte ranges within the byte values for a time period. If the byte ranges are stable the byte ranges are concatenated into a string (e.g., in a systematic order—for example, ordered by position in a packet) and hashed to determine a fingerprint. Or for example, specific counters (e.g., engine life, odometer, etc.) are identified in data packets and used for a fingerprint. The fingerprint(s) is/are then compared to a database of stored fingerprint(s) to identify (e.g., determine a most likely or a likely) associated vehicle identifier (e.g., a fleet identifier, a vehicle identification number (VIN), etc.). For example, the hashed fingerprints match database stored fingerprints associated with a vehicle and counter values are within nearby value ranges that have incremented since a last determination (e.g., counter x is within threshold range y from last stored value y' and x is greater than y'). The vehicle identifier is then stored associated with the vehicle trip stored data (e.g., on vehicle event recorder 102 and/or on vehicle data server 104).

In the example shown, vehicle event recorder 200 comprises processor 202. Processor 202 controls the operations of vehicle event recorder 200 including reading and writing information on data storage 204, communicating via wireless communications interface 206, and reading data via sensor interface 208. In various embodiments, processor 202 comprises a processor for determining a vehicle characterization, determining a vehicle identifier, determining a maintenance item, or for any other appropriate purpose. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In various embodiments, vehicle event recorder 200 communicates with vehicle state sensors via the OBD bus. In some embodiments, vehicle event recorder 200 communicates with a vehicle data server via communications interfaces 206. In various embodiments, vehicle event recorder 200 transmits vehicle state sensor data, accelerometer data, speed data, maneuver data, audio data, video data, event data, or any other appropriate data to the vehicle data server. In some embodiments, vehicle event recorder 200 receives an indication of a route from the vehicle data server. In some embodiments, vehicle event recorder 200 receives a set of route segment safety scores from the vehicle data server and determines a route based at least in part on the set of route segment safety scores.

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, etc.). In some embodiments, data is deleted from the time-delay buffer after the time-delay period (e.g., a buffer holding the last 30 seconds of data deletes data as soon as it is more than 30 seconds old). In some embodiments, in the event an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, in the event an event is determined from continuously stored data, an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded.

Figure 3:
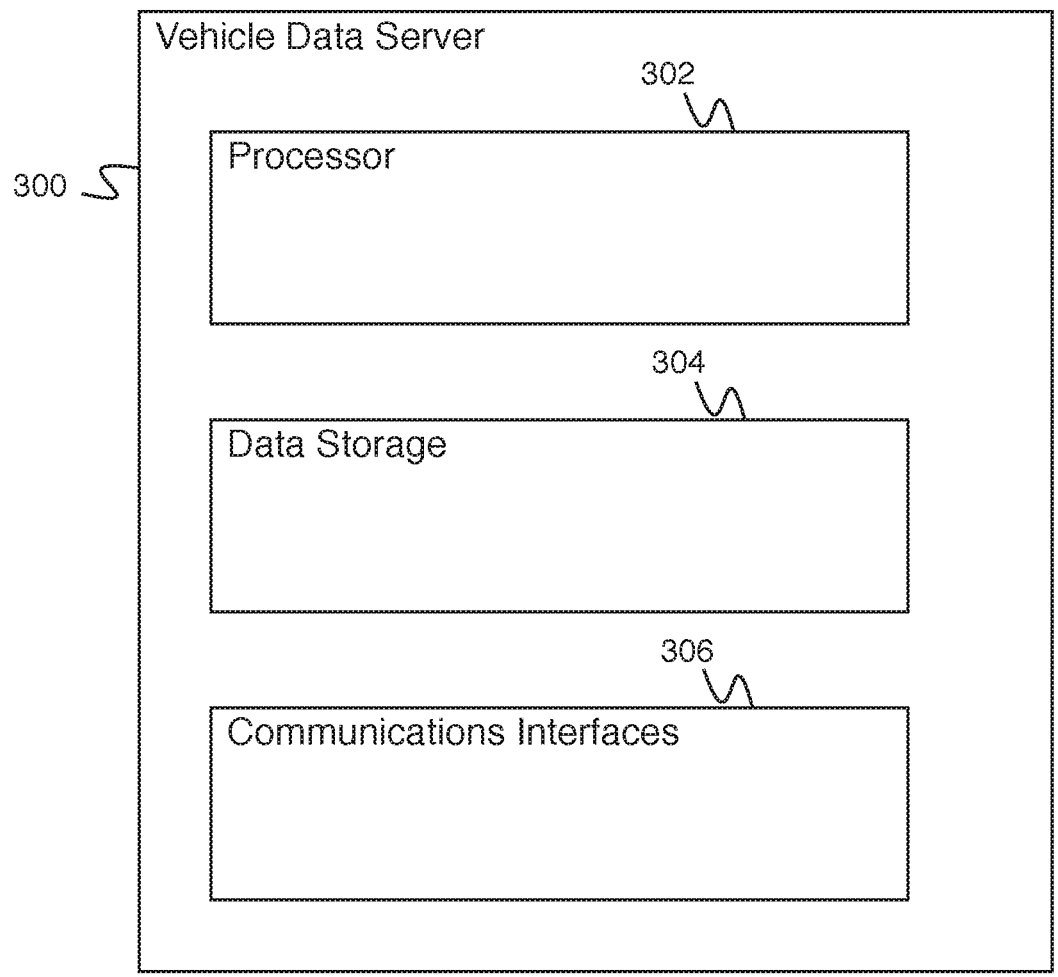
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 stores fingerprints associated with vehicles. The server provides a set of fingerprints stored in data storage 304 to vehicle event recorders to identify likely vehicle identifiers (e.g., in the event that a fingerprint matches associated with a vehicle event identifier, in the event that a majority of fingerprints match associated with a vehicle event identifier, etc.). Vehicle data server 300 receives via communications interfaces 306 fingerprint information from vehicle event recorders—for example, for updates or to check for vehicle matches that are not in a local vehicle event recorder database. For example, processor 302 checks received fingerprint(s) and compares to master fingerprint index (e.g., stored in data storage 304) and in the event that a number of fingerprints associated with a vehicle identifier is greater than a threshold (e.g., more than half the total number of fingerprints, more than a fixed number of fingerprints—for example, greater than 3, etc.), then the vehicle identifier is associated with the fingerprints and provided to the vehicle event recorder that sent the fingerprints.

In the example shown, vehicle data server 300 comprises processor 302. In various embodiments, processor 302 comprises a processor for determining a route, determining a set of route segments, determining a route segment safety score, collecting speed data, determining a speed distribution, or for any other appropriate purpose. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, machine learning algorithm data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface. In various embodiments, vehicle data server 300 receives events, maneuvers, data, or any other appropriate information from one or more vehicle event recorders.

Figure 4:
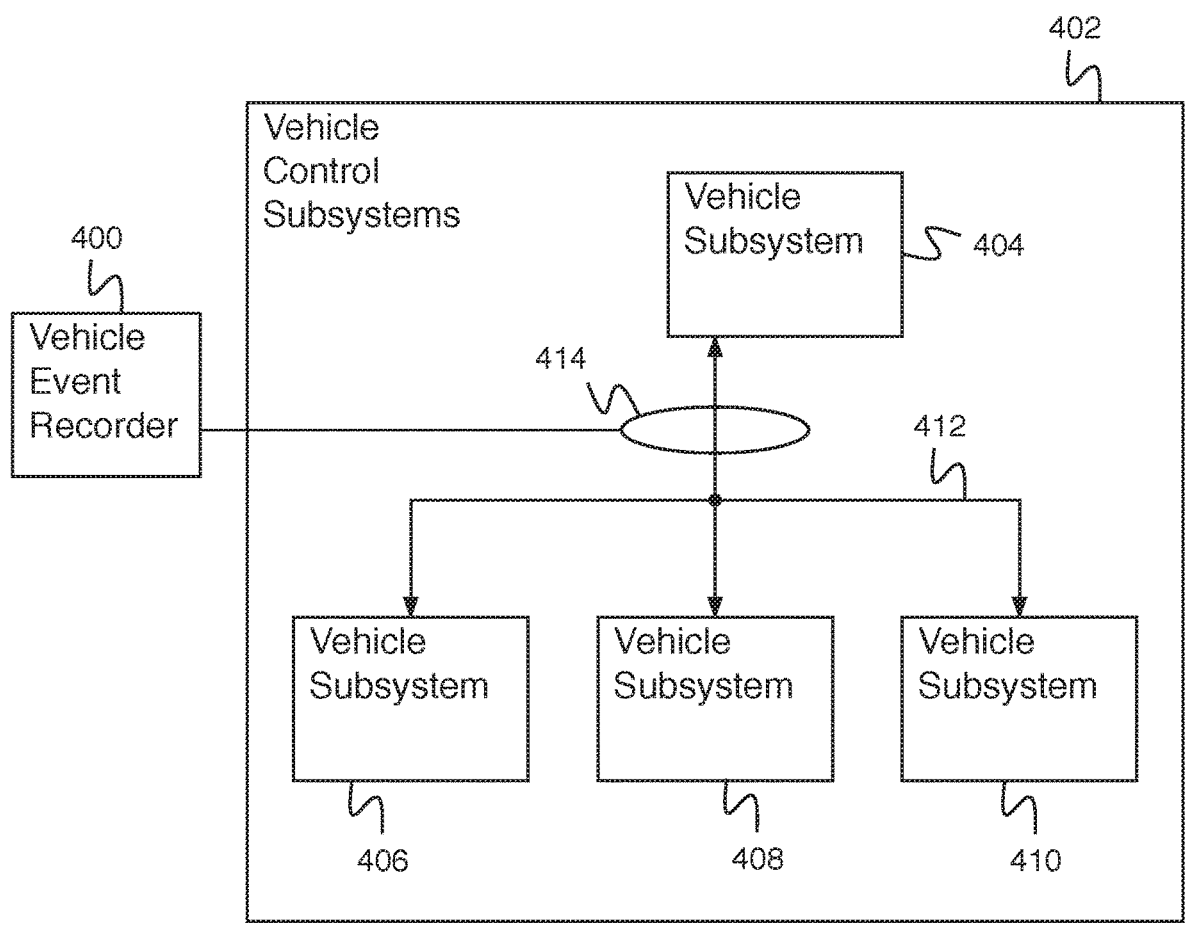
FIG. 4 is a block diagram illustrating an embodiment of a vehicle event recorder and vehicle control subsystems.

FIG. 4 is a block diagram illustrating an embodiment of a vehicle event recorder and vehicle control subsystems. In some embodiments, vehicle event recorder 400 comprises vehicle event recorder 102 of FIG. 1 and vehicle control subsystems 402 comprises vehicle control subsystems 108 of FIG. 1. In the example shown, vehicle event recorder 400 is able to monitor bus signals between vehicle subsystems (e.g., vehicle subsystem 404, vehicle subsystem 406, vehicle subsystem 408, and vehicle subsystem 410) of vehicle control subsystems 402. The bus signals include communication traffic between subsystems of a vehicle that can be used to characterize a vehicle. By monitoring the communication traffic over a period of time, vehicle event recorder 400 can establish a set of communications and the range of values within the communications. The communication traffic that is stable over longer periods of time has the same byte ranges over several time periods. The ranges of byte values are then placed in order (e.g., by position within a packet) and then hashed to form a fingerprint.

In the example shown, vehicle control subsystems 402 comprises a plurality of vehicle subsystems (e.g., vehicle subsystem 404, vehicle subsystem 406, vehicle subsystem 408, and vehicle subsystem 410). The subsystems of the plurality of vehicle subsystems communicate via bus 412. In some embodiments, bus 412 comprises a bus network wherein all communications between any pair of subsystems of vehicle control subsystems 402 appear on all wires of the bus. In various embodiments, bus 412 comprises a Society of Automotive Engineers (SAE) J1939 bus, a SAE J1708 bus, an OBD-II bus, a controller area network (e.g., CAN) bus, or any other appropriate bus. Vehicle event recorder 400 receives signals via capacitive coupling 414. Capacitive coupling 414 comprises a capacitive coupling for receiving signals from bus 412. In some embodiments, capacitive coupling 414 comprises a capacitive loop antenna that is wrapped around a wire of bus 412. In some embodiments, capacitive coupling 414 couples to bus 412 without modification to bus 412 (e.g., without cutting wires, adding connectors, etc.).

Figure 5A:
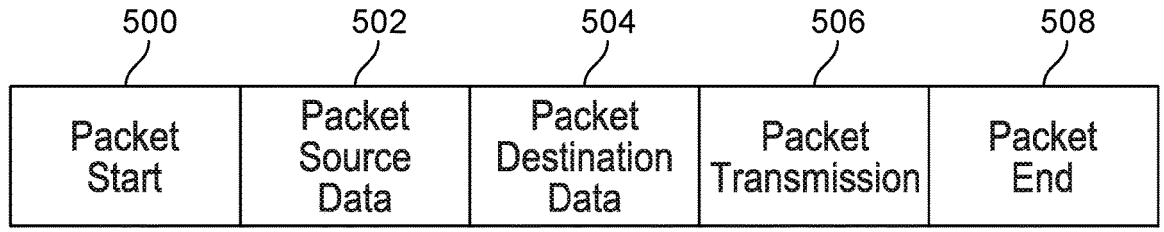
FIG. 5A is a diagram illustrating an embodiment of a data packet format.

FIG. 5A is a diagram illustrating an embodiment of a data packet format. In some embodiments, the data packet format of FIG. 5A comprises the format of a data packet sent from a first vehicle subsystem (e.g., a first vehicle subsystem of FIG. 4) to a second vehicle subsystem (e.g., a second vehicle subsystem of FIG. 4) via a bus (e.g., bus 412 of FIG. 4). In the example shown, the communication traffic on a vehicle bus can be information sent using a packet. The information in a packet—for example, packet start 500, packet source data 502, packet destination data 504, packet transmission 506, or packet end 508—is monitored by a vehicle event recorder. A plurality of packets is compiled and sorted for those whose data ranges is stable over time. The stable or core packets byte ranges are hashed to form a fingerprint. The unstable or transient packets are sometimes used as other types of fingerprints (e.g., those tracking engine hours to see if the values are appropriate—for example, increasing and close to recent prior values). The core packets can include all monitored packets or they can be formed into a set of groups to form a set of fingerprints.

In the example shown, the data packet format of FIG. 5A comprises packet start 500, packet source data 502, packet destination data 504, packet data 506, and packet end 508. Packet start 500 comprises a code indicating that a packet is starting. The code of packet start 500 comprises a code of one or more codes for indicating that a packet is starting. The code of packet start 500 comprises one or more bits. Packet source data 502 comprises a code indicating the source of the data packet (e.g., the vehicle subsystem that transmitted the data packet). The code of packet source data 502 comprises one or more bits. In some embodiments, packet source data 502 comprises an address associated with the source of the data packet. Packet destination data 504 comprises a code indicating the destination of the data packet (e.g., the vehicle subsystem to receive the data packet). The code of packet destination data 504 comprises one or more bits. In some embodiments, packet destination data 504 comprises an address associated with the source of the data packet. Packet transmission 506 comprises transmission data (e.g., data that is being transmitted from the source to the destination). Packet transmission 506 comprises one or more bits. In various embodiments, packet transmission 506 comprises 1 bit, 1 byte, 4 bytes, 8 bytes, 64 bytes, or any other appropriate amount of data. In some embodiments, packet transmission 506 comprises packet type data (e.g., a sensor data packet type, a system state packet type, a query packet type, a system command packet type, a counter packet type, etc.). In various embodiments, packet transmission 506 comprises subsystem state information, subsystem control information (e.g., commands provided by one subsystem to another subsystem), sensor data, data queries, counter data (e.g., odometer data, engine total running time data, engine total idle time data, etc.), or any other appropriate data. Packet end 508 comprises a code indicating that a packet is ending. The code of packet end 508 comprises a code of one or more codes for indicating that a packet is ending. The code of packet end 508 comprises one or more bits.

Figure 5B:
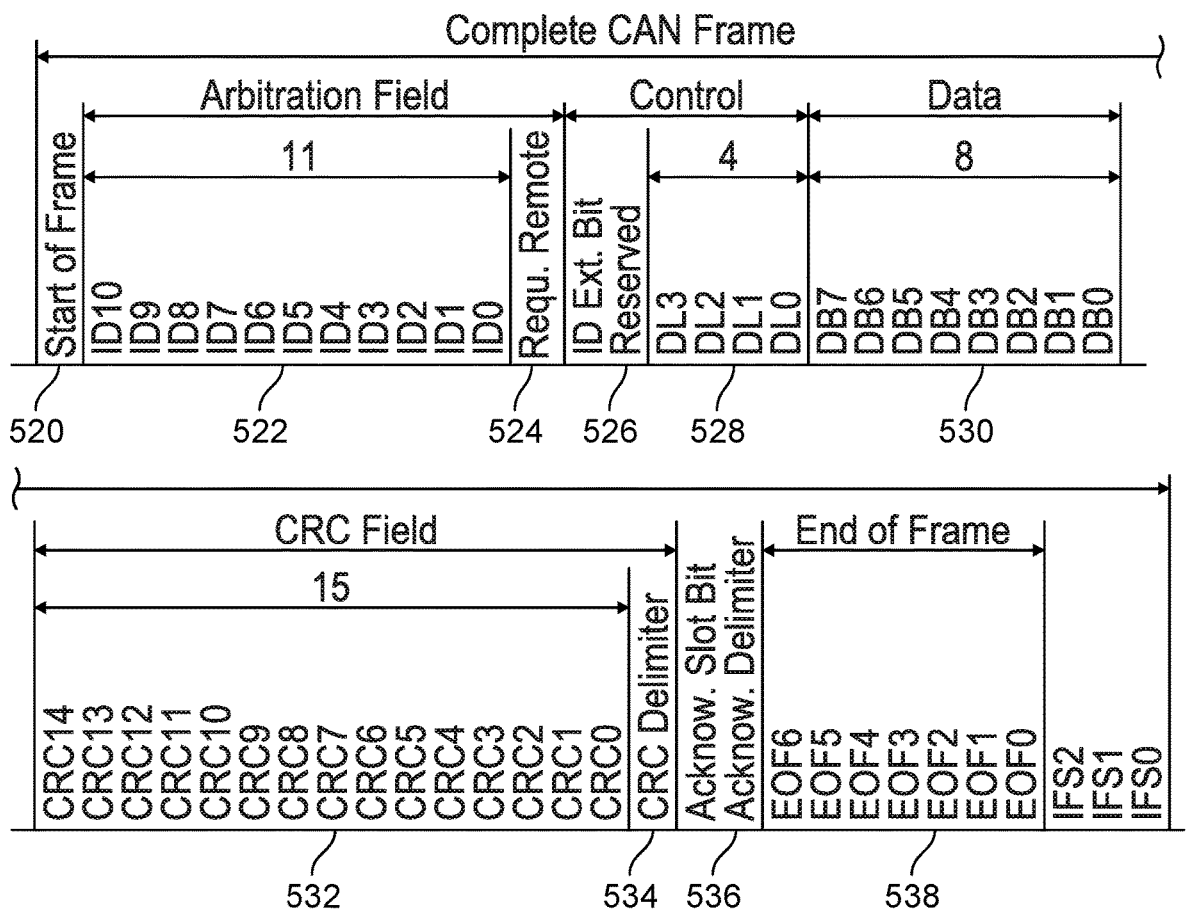
FIG. 5B is a diagram illustrating an embodiment of a data packet format.

FIG. 5B is a diagram illustrating an embodiment of a data packet format. In some embodiments, the data packet format of FIG. 5B comprises the format of a data packet sent from a first vehicle subsystem (e.g., a first vehicle subsystem of FIG. 4) to a second vehicle subsystem (e.g., a second vehicle subsystem of FIG. 4) via a bus (e.g., bus 412 of FIG. 4). In the example shown, the communication traffic on a vehicle bus can be information sent using a packet. The information in a packet—for example, start-of-frame 520, identifier 522, remote transmission request 524, identifier extension bit and reserve bit 526, data length code 528, data field 530, cyclic redundancy check 532, cyclic redundancy check delimiter 534, acknowledgement slot and delimiter 536, and end of frame 538—is monitored by a vehicle event recorder. A plurality of packets is compiled and sorted for those whose data ranges is stable over time. The stable or core packets byte ranges are hashed to form a fingerprint. The unstable or transient packets are sometimes used as other types of fingerprints (e.g., those tracking engine hours to see if the values are appropriate—for example, increasing and close to recent prior values). The core packets can include all monitored packets or they can be formed into a set of groups to form a set of fingerprints.

In the example shown, data packet format is a controller area network (CAN bus) data format (e.g., CAN standard 11898). The data packet format includes start-of-frame 520, identifier 522 (e.g., identifies the type of packet and in some cases priority of packet), remote transmission request 524, identifier extension bit and reserve bit 526, data length code 528 (e.g., indicating length of data field), data field 530, cyclic redundancy check 532 (e.g., error detection for data or frame), cyclic redundancy check delimiter 534, acknowledgement slot and delimiter 536, and end of frame 538.

FIG. 6 is a diagram illustrating an embodiment of packet counter data. In some embodiments, data of FIG. 6 comprises counter data extracted from packets detected on a bus (e.g., from packet data 506 of the data packet format of FIG. 5A or data 530 of FIG. 5B). In the example shown, packet counter data comprises odometer data, engine total running time data, and engine total idle time data. Odometer data comprises the total number of miles driven over the vehicle lifetime. Engine total running time data comprises the total number of hours the engine has been running over the vehicle lifetime. Engine total idle time data comprises the total number of hours the engine has been idle over the vehicle lifetime. In some embodiments, the packet counter data is included in a data fingerprint. In some embodiments, odometer data, engine total running time data, and/or engine total idle time data is/are included in a data fingerprint.

In various embodiments, engine type and/or transmission type is/are determined from packet data and are included in a data fingerprint. In some embodiments, special packet or proprietary packet information or existence of a proprietary packet is included in a data fingerprint.

In some embodiments, a packet identifier is comprised of an address and the data length of the packet. In some embodiments, the address comprises an 11-bit or a 29-bit address. In some embodiments, a packet is categorized as a core or transient packet. In some embodiments, a core packet comprises a packet with an identifier seen in all recording sessions (e.g., a time period during which packets are recorded). In some embodiments, a transient packet comprises a packet whose an identifier is not seen in all recording sessions. In some embodiments, transient packet are generated when previously undetected packet identifiers are used. For example, a scan tool is attached to perform a smog check or a maintenance diagnostic on a vehicle. Or for example, a new piece of equipment is added to a vehicle (e.g., an insurance logger, a telematics device, etc.).

In some embodiments, data within the core packets takes on ranges unique to the vehicle. In some embodiments, when a packet is received during a recording session, each byte in the payload is evaluated and the high/low range for the byte is updated. A constructed string of data comprising detected data ranges that are subsequently run through a hash function. The constructed string can be used as an identifier or a fingerprint that is unique to the vehicle. Similar identifiers or fingerprints can be generated for one or more busses on a vehicle. The identifiers or fingerprints can be used alone or in combination to identify the vehicle. In some embodiments, a number of fingerprints are calculated for a number of sessions. In some embodiments, a stability of the fingerprint for a given bus is determined, and in the event that the fingerprint is stable, the fingerprint is stored to be used to identify a vehicle. In some embodiments, stability is determined prior to hashing the data ranges recorded in a session. In some embodiments, the stability is determined based at least upon monitoring the stability of the data ranges of all the bytes or a subset of the bytes of a frame—for example, stability is the state of being unchanging over time (e.g., unchanging byte ranges). In some embodiments, the byte ranges are a subset of the full range of values for a byte (e.g., for a byte not the range 00:FF).

FIG. 7A is a table illustrating an embodiment of a number of unique packets. In the example shown, a group of General Motors vehicles was selected and data from several driving sessions were collected. The vehicles included 2009 Saturn Aura, 2017 Chevrolet Impala, 2012 Chevrolet Malibu, 2009 Chevrolet Malibu, 2007 Chevrolet Silverado, 2010 Chevrolet Silverado, 2016 Chevrolet Volt, and 2017 Cadillac XTS with a number of unique frames 47, 96, 31, 47, 55, 63, 57, 114, and 110, respectively.

Figure 7B:
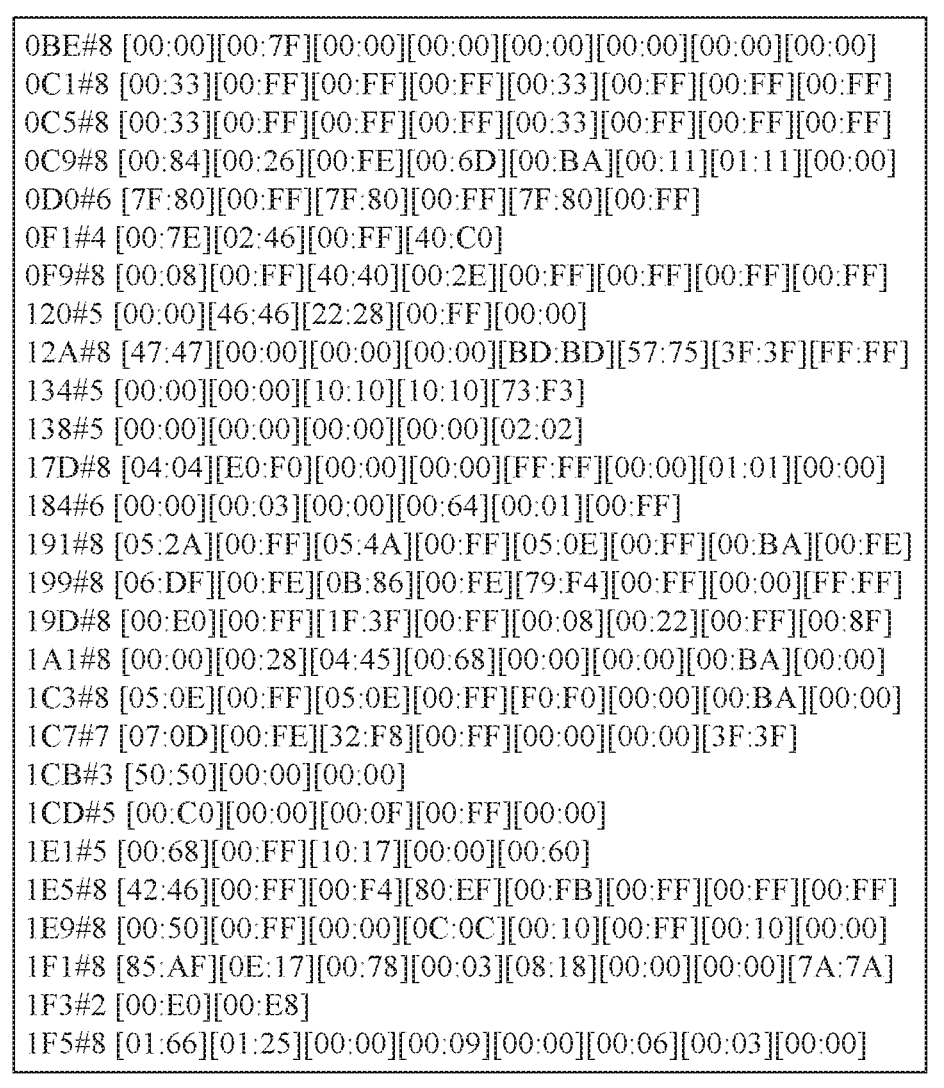
Figure 7C:
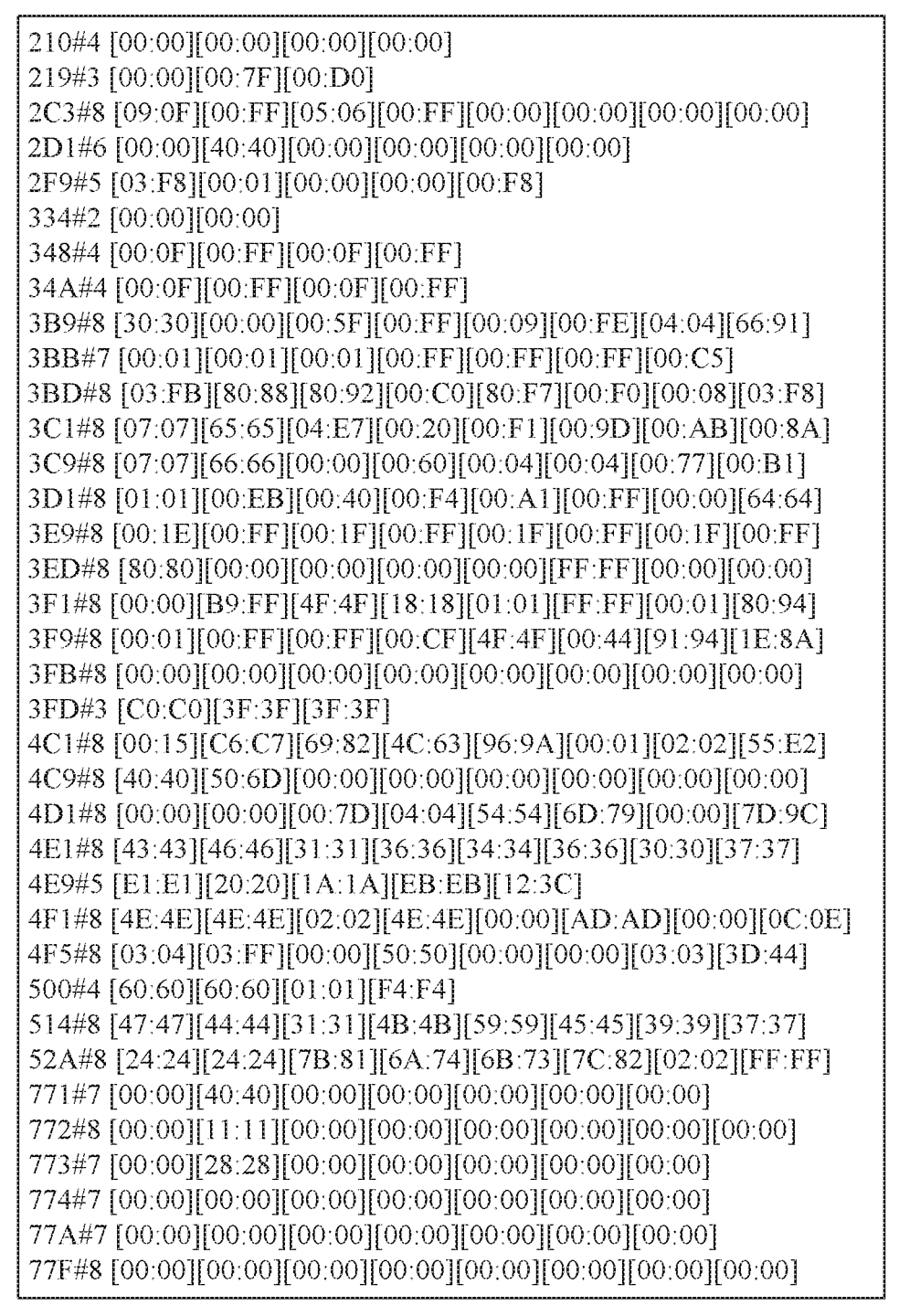

FIGS. 7B and 7C are tables illustrating an embodiment of a packet range map. In the example shown, the tables show data collected from the test vehicle Silverado 607 of FIG. 7A. The packet map shows data ranges for bytes of a packet belonging to a given packet identifier. For example, packet identifier 0BE#8 has byte data ranges [00:00] [00:7F] [00:00] [00:00] [00:00] [00:00] [00:00] [00:00].

In various embodiments, to create a vehicle identifier or fingerprint, the packet byte ranges with or without their packet identifier are appended in order into a long string. In some embodiments, in event that the low byte value of the range is equal to the high byte value of the range only one of the values is appended into the string. So for example, the string for 0BE#8 could be constructed as 007F000000 with compression or 0000007F0000000000000000000000000 without compression of values. The string, once constructed, is then passed through a function (e.g., a hash function—for example, MD5 or SHA, a summing function, or any other appropriate function) to generated the identifier or fingerprint.

In some embodiments, certain data ranges will be constrained to a range (e.g., those data associated with non-counter values. In some embodiments, only constrained byte values are used for the vehicle identifier (e.g., as appended and hashed).

Figure 8:
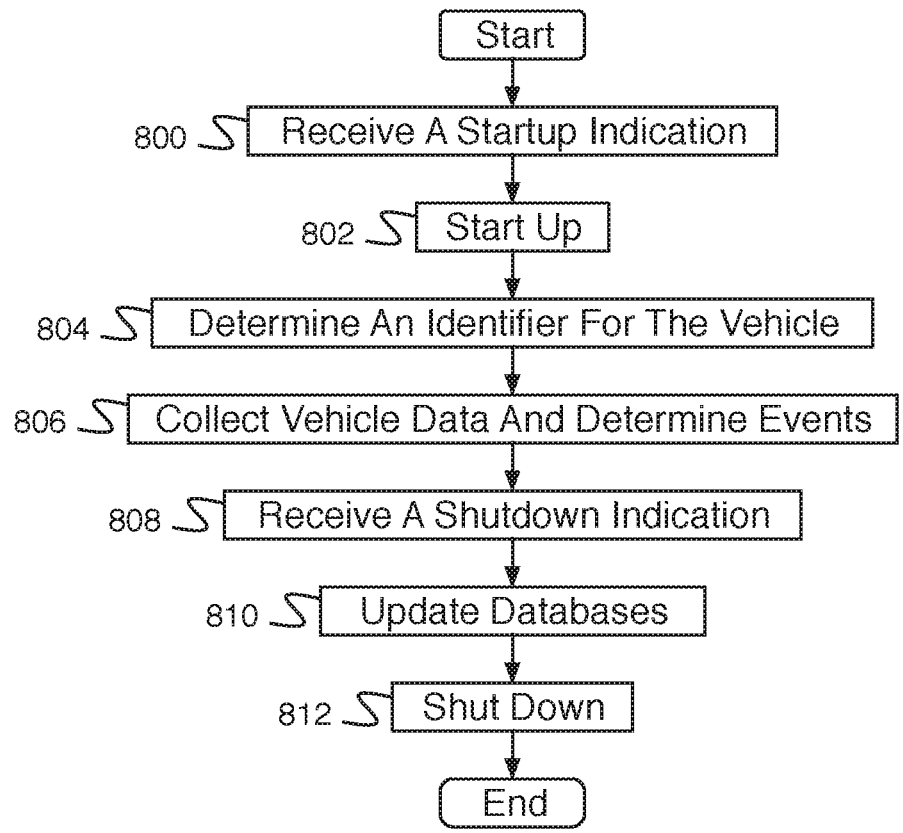
FIG. 8 is a flow diagram illustrating an embodiment of a process for a vehicle event recorder system.

FIG. 8 is a flow diagram illustrating an embodiment of a process for a vehicle event recorder system. In some embodiments, the process of FIG. 8 is executed by vehicle event recorder system 102 of FIG. 1. In some embodiments, the process of FIG. 8 is executed by a vehicle event recorder system mounted on a vehicle. In the example shown, in 800, a startup indication is received (e.g., from a user, from a vehicle, from a vehicle data server, etc.). In 802, the vehicle event recorder starts up. In 804, an identifier for the vehicle is determined. For example, a specific vehicle identifier (e.g., a vehicle identification number (VIN), a fleet identification number, etc.) or a type of vehicle identifier (e.g., a manufacturing make, model, or fleet type, etc.) is determined using fingerprint data. In some embodiments, the identifier identifies which vehicle of a set of vehicles the vehicle event recorder is mounted on and/or which vehicle type of a set of vehicle types the vehicle event recorder is mounted on. In some embodiments, an identifier for the vehicle is determined based at least in part on database data. In some embodiments, the fingerprint data is compared to vehicle identity data or vehicle type data stored on the vehicle event recorder or retrieved from a vehicle server (e.g., a request is made for matching data for a fingerprint by providing the fingerprint to the server, and the server responds with a vehicle type or a vehicle identifier). In 806, vehicle data is collected and events are determined. In various embodiments, vehicle data comprises vehicle sensor data, vehicle state sensor data, packet data, or any other appropriate data. In various embodiments, events comprise anomalous events, maneuver events, driver behavior events, road condition events, unsafe loading events, or any other appropriate events. In 808, a shutdown indication is received. In 810, databases are updated (e.g., database data for determining a vehicle identifier is updated). In some embodiments, databases are updated based at least in part on collected vehicle data. In 812, the vehicle event recorder shuts down.

Figure 9:
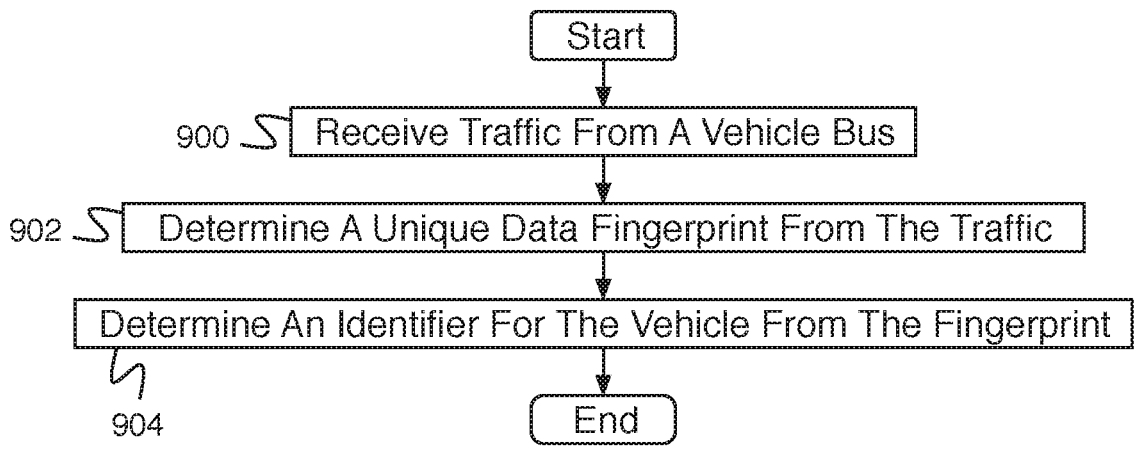
FIG. 9 is a flow diagram illustrating an embodiment of a process for determining an identifier for a vehicle.

FIG. 9 is a flow diagram illustrating an embodiment of a process for determining an identifier for a vehicle. In some embodiments, the process of FIG. 9 implements 804 of FIG. 8. In the example shown, in 900, traffic from a vehicle bus is received. In 902, a unique data fingerprint is determined from the traffic. In various embodiments, the unique data fingerprint comprises counter data (e.g., odometer data, engine total time data, engine total idle time data, engine type, transmission type, etc.), packet data (e.g., a packet frequency, a proprietary packet type, etc.), packet set data (e.g., a set of packet sources, a set of packet destinations, etc.), or any other appropriate data. In 904, an identifier for the vehicle (e.g., an identifier identifying the vehicle) is determined from the fingerprint. For example, the fingerprint is compared to previously stored fingerprints, where a fingerprint has an associated vehicle type and/or vehicle identifier. In various embodiments, the identifier comprises a vehicle type identifier (e.g., an identifier identifying the vehicle make, the vehicle model, the vehicle year, the vehicle configuration, etc.), a vehicle specific identifier (e.g., an identifier uniquely identifying the specific vehicle), a vehicle identification number (e.g., a VIN number as defined by the International Organization for Standardization standard number 3833), or any other appropriate identifier. In various embodiments, a fingerprint is compared to a stored fingerprint on the vehicle event recorder, on a server, or in any other appropriate location. In various embodiments, a set of stored fingerprints is stored permanently on the vehicle event recorder, a subset of stored fingerprints is loaded on the vehicle event recorder (e.g., the subset associated with vehicles at a storage facility and uploaded to the vehicle event recorder), a set or subset of stored fingerprints is stored on a server, or any other appropriate storage strategy.

Figure 10:
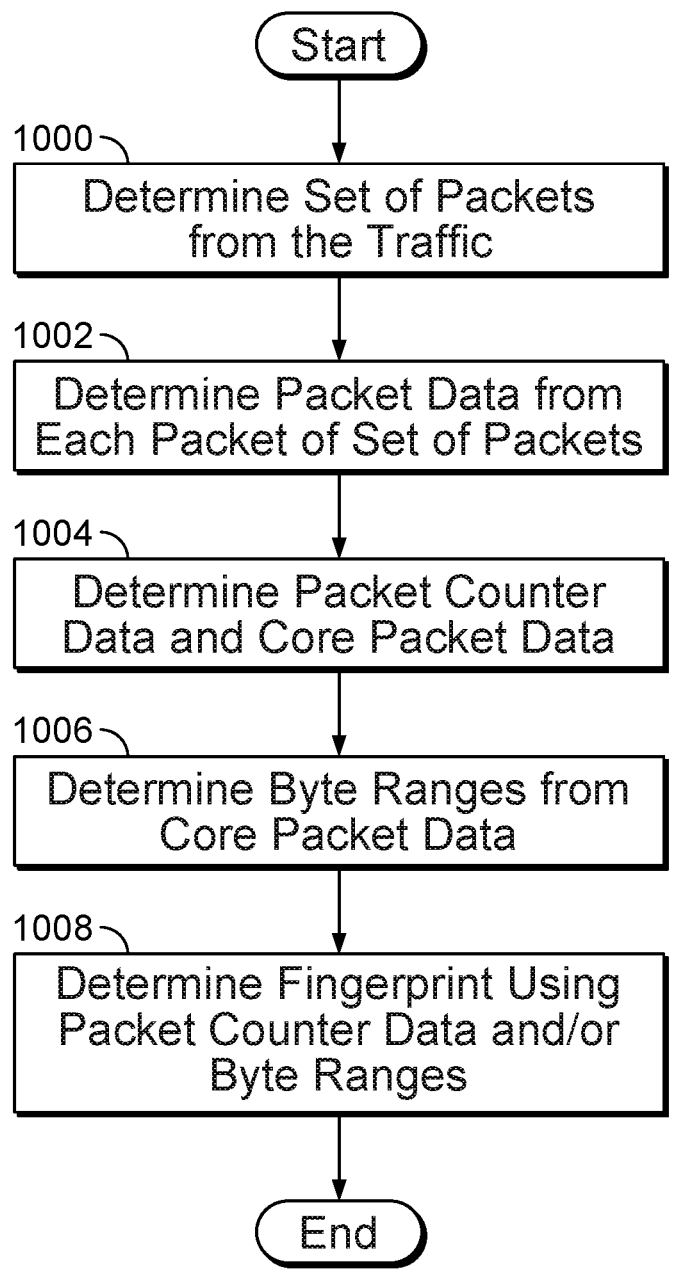
FIG. 10 is a flow diagram illustrating an embodiment of a process for determining a data fingerprint from traffic.

FIG. 10 is a flow diagram illustrating an embodiment of a process for determining a data fingerprint from traffic. In some embodiments, the process of FIG. 10 implements 902 of FIG. 9. In the example shown, in 1000, a set of packets are determined from the traffic. In some embodiments, determining a packet from traffic (e.g., vehicle bus traffic) comprises identifying a packet in the traffic based at least in part on a packet data format (e.g., the packet data format of FIG. 5). In 1002, packet data from each of the set of packets is determined. In various embodiments, packet data comprises packet source data, packet destination data, packet transmission data, or any other appropriate packet data. In 1004, packet counter data and core packet data is determined. For example, packets are monitored to determine whether or not packets are stable or core or unstable or transient. In 1006, byte ranges are determined from core packet data. For example, byte value ranges are determined for the core packet data. In 1008, fingerprints are determined using packet counter data and/or byte ranges. For example, stable byte ranges are concatenated and hashed to form a fingerprint or counter data is used to form a fingerprint.

In various embodiments, packet data is received using traffic information from a vehicle (e.g., SAE J1939 bus, OBD-II bus, etc.). In various embodiments, a fingerprint includes one or more of the following: proprietary packet type, packet source(s), packet destination(s), proprietary packet data, or any other appropriate data and/or metric.

Figure 11:
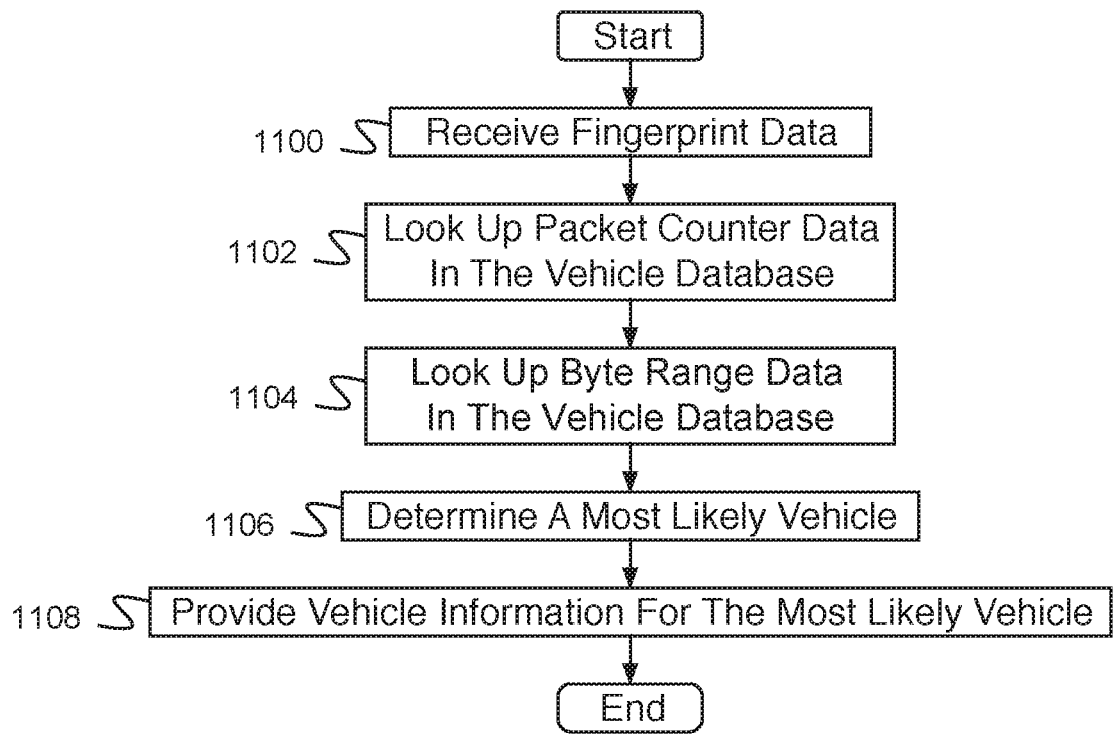
FIG. 11 is a flow diagram illustrating an embodiment of a process for determining an identifier for a vehicle from a fingerprint.

FIG. 11 is a flow diagram illustrating an embodiment of a process for determining an identifier for a vehicle from a fingerprint. In some embodiments, the process of FIG. 11 implements 904 of FIG. 9. The process of FIG. 11 comprises a process for determining an identifier for a vehicle from a fingerprint using a database. In some embodiments, a database comprises a local data storage device (e.g., a data storage on a vehicle event recorder). In some embodiments, a database comprises an external data storage device (e.g., a data storage device on a vehicle data server). In the example shown, in 1100, fingerprint data is received. In some embodiments, fingerprint data comprises packet counter data and packet histogram data. In 1102, packet counter data is looked up in the vehicle database. Looking up packet counter data in the vehicle database comprises determining one or more instances of packet counter data in the vehicle database similar to the packet counter data of the fingerprint (e.g., appropriate for the counter—for example, increasing and close in value). In 1104, byte range data is looked up in the vehicle database. For example, a hash value of byte ranges or a fingerprint is looked up in the vehicle database. In 1106, a most likely vehicle is determined. For example, a matching number of fingerprints is greater than a threshold or a counter fingerprint is within a threshold of a prior value and is moving the appropriate direction. In 1108, the vehicle information for the most likely vehicle is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for identifying a vehicle, comprising:
an input interface configured to receive traffic from a vehicle bus; and
a processor configured to:
determine a data fingerprint from the traffic, wherein the determining of the data fingerprint comprises to:
perform one or more of the following:
A) extract counter data from the traffic, the counter data including odometer data, engine total time data, engine total idle time data, engine type, transmission type, or any combination thereof; or
B) determine a set of packets from the traffic based at least in part on a packet data format;
monitor the set of packets to determine whether or not packets are stable or core or unstable or transient; and
determine byte value ranges for the core packet data; and
generate the data fingerprint based on the counter data, the byte value ranges of the core packet data, or both; and
determine an identifier for the vehicle based at least in part on the data fingerprint, wherein determining the identifier comprises matching the data fingerprint with a stored fingerprint of a set of stored fingerprints, wherein the stored fingerprint corresponds to the identifier for the vehicle.

2. The system of claim 1, wherein the vehicle bus comprises a SAE J1939 bus.

3. The system of claim 1, wherein the vehicle bus comprises an OBD-II bus.

4. The system of claim 1, wherein the system further comprises a capacitive coupling to the vehicle bus.

5. The system of claim 1, wherein the data fingerprint comprises odometer data.

6. The system of claim 1, wherein the data fingerprint comprises engine total time data.

7. The system of claim 1, wherein the data fingerprint comprises engine total idle time data.

8. The system of claim 1, wherein the data fingerprint comprises a proprietary packet type.

9. The system of claim 1, wherein the data fingerprint comprises a set of packet sources.

10. The system of claim 1, wherein the data fingerprint comprises a set of packet destinations.

11. The system of claim 1, wherein the identifier comprises a vehicle type identifier.

12. The system of claim 1, wherein the identifier comprises a vehicle specific identifier.

13. The system of claim 1, wherein the identifier comprises a vehicle identification number.

14. The system of claim 1, wherein determining the identifier comprises querying a data storage device using the data fingerprint.

15. The system of claim 1, wherein determining the identifier comprises querying an external system using the data fingerprint.

16. A method for identifying a vehicle, comprising:
receiving traffic from a vehicle bus;
determining, using a processor, a unique data fingerprint from the traffic, wherein the determining of the data fingerprint comprises:
performing one or more of the following:
A) extracting counter data from the traffic, the counter data including odometer data, engine total time data, engine total idle time data, engine type, transmission type, or any combination thereof; or
B) determining a set of packets from the traffic based at least in part on a packet data format;
monitoring the set of packets to determine whether or not packets are stable or core or unstable or transient; and
determining byte value ranges for the core packet data; and
generating the data fingerprint based on the counter data, the byte value ranges of the core packet data, or both; and
determining an identifier for the vehicle based at least in part on the data fingerprint, wherein determining the identifier comprises matching the data fingerprint with a stored fingerprint of a set of stored fingerprints, wherein the stored fingerprint corresponds to the identifier for the vehicle.

17. A computer program product for identifying a vehicle, the computer program product being embodied in a non-transitory computer readable storage medium and comprising computer instructions for:
receiving traffic from a vehicle bus;
determining a unique data fingerprint from the traffic, wherein the determining of the data fingerprint comprises:
performing one or more of the following:
A) extracting counter data from the traffic, the counter data including odometer data, engine total time data, engine total idle time data, engine type, transmission type, or any combination thereof; or
B) determining a set of packets from the traffic based at least in part on a packet data format;
monitoring the set of packets to determine whether or not packets are stable or core or unstable or transient; and
determining byte value ranges for the core packet data; and
generating the data fingerprint based on the counter data, the byte value ranges of the core packet data, or both; and
determining an identifier for the vehicle based at least in part on the data fingerprint, wherein determining the identifier comprises matching the data fingerprint with a stored fingerprint of a set of stored fingerprints, wherein the stored fingerprint corresponds to the identifier for the vehicle.

* * * * *